June 21, 1960  O. DE MURREL CRUMP  2,941,843
ENSILAGE LOADING APPARATUS
Filed Jan. 5, 1959  4 Sheets-Sheet 1

INVENTOR.
Owen DeMurrel Crump.
BY
Fishburn and Gold
ATTORNEYS.

INVENTOR.
Owen DeMurrel Crump.
BY
ATTORNEYS.

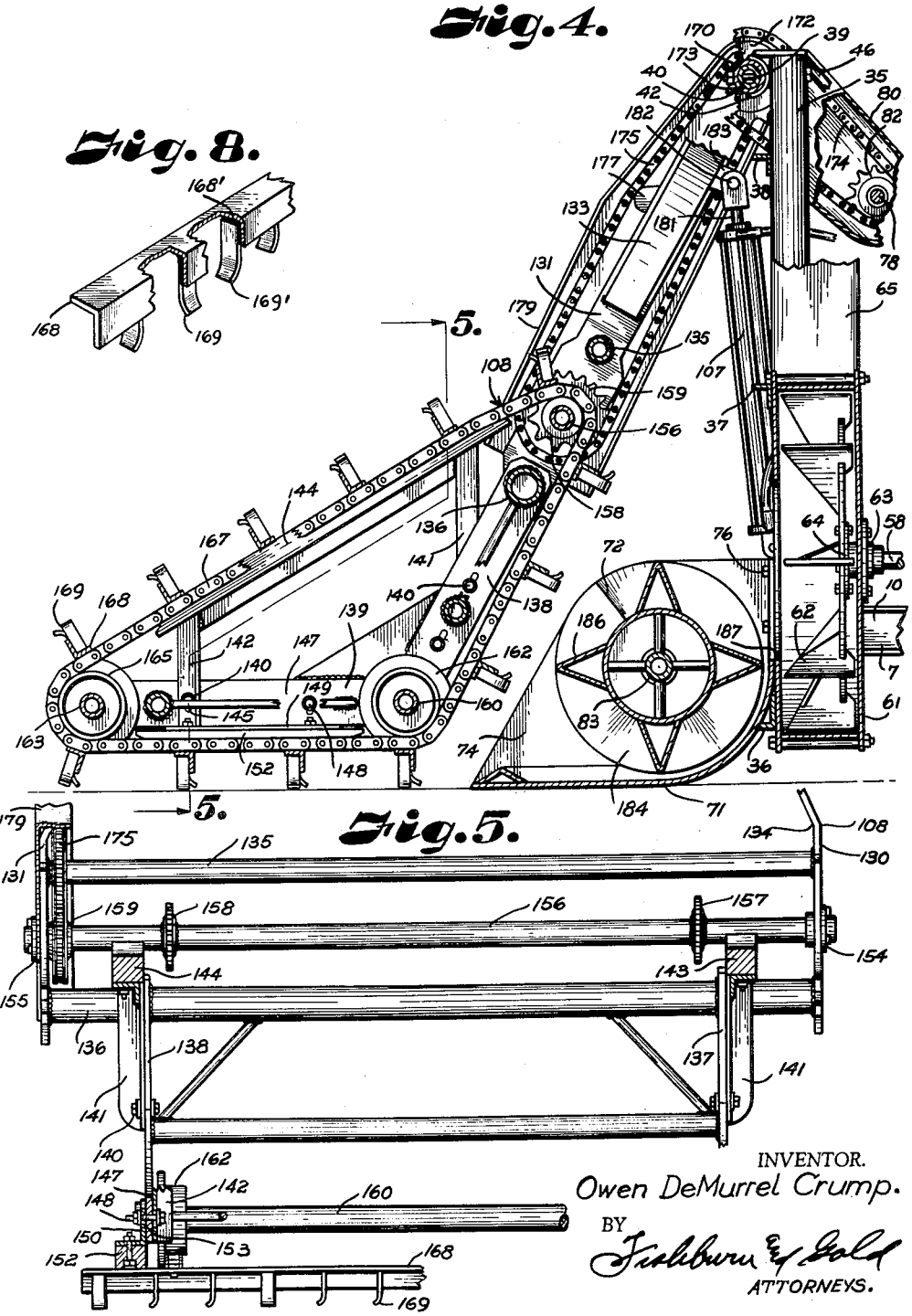

June 21, 1960  O. DE MURREL CRUMP  2,941,843
ENSILAGE LOADING APPARATUS
Filed Jan. 5, 1959  4 Sheets-Sheet 4

INVENTOR.
Owen DeMurrel Crump.
BY
ATTORNEYS.

United States Patent Office 2,941,843
Patented June 21, 1960

2,941,843

ENSILAGE LOADING APPARATUS

Owen De Murrel Crump, 501–11 S. Kansas Ave., Olathe, Kans.

Filed Jan. 5, 1959, Ser. No. 784,954

6 Claims. (Cl. 302—56)

This invention relates to an apparatus for loading ensilage, and more particularly to a device for picking up ensilage from a trench or the like and transferring it to a truck for transportation to a place of use.

The principal object of the present invention is to provide a mobile device operable from the power take-off of a tractor which may be moved to the ensilage pit or trench and the pan or apron of the auger apparatus lowered to the ground and the digger assembly lowered to contact the ensilage and move it into the pan where the auger picks it up and passes it to a blower which transports the ensilage through a tubular chute to the truck.

Other objects of the present invention are to provide a framework mounted on wheels for transportation of the apparatus; to provide means for mounting the auger and pan on the lower portion of the frame; to provide a boom member for the digger assembly mounted on the upper end of the frame; to provide side plates or members for the auger mechanism and one of which extends upwardly alongside of the frame; to provide means for mounting a jack shaft in the upper end of the plate and a housing secured to the plate for housing sprockets on the shaft connected with the sprockets on the shaft of the auger; to provide a plate on the opposite side of the frame for mounting one end of the jack shaft; to provide the boom member with sprockets cooperating with the sprockets on the shaft at the upper end of the housings of the auger mechanism and having chain connection therewith; to provide means for mounting the digger assembly on said boom; to provide hyraulic means connected to the digger assembly on said boom for raising and lowering the digger assembly by the boom; to provide a blower for carrying the ensilage through a spout to the truck; to provide a main drive shaft including chains and sprockets carried by the frame for driving the blower and having belt connection with pulleys on the jack shaft and means on the boom member for operating the auger mechanism and digger assembly; to provide clutch means operable from the tractor for the main drive means; to provide hydraulic means operable from the tractor for operating the hydraulic mechanism, including the cylinder for raising and lowering the boom with the digger assembly; to provide the auger in the pan or apron with oppositely directed helical blades to carry the ensilage to the center of the auger; to provide radially extending blades or fins on the auger at substantially the center thereof for feeding the ensilage to the blower; to provide means for raising and lowering the pan or apron on the frame with respect to the ground, and particularly to lower the pan to the surface of the ground or floor where the ensilage is kept to take the load from the wheels of the mobile vehicle; to provide an endless chain and slat assembly for the digger portion of the device, and means for driving the same; to provide means for tightening the chains on the boom and digger assembly mechanism; and to provide a device of this character simple and economical to manufacture.

In accomplishing these and other objects of the invention I have provided improved details of structure, the preferred forms of which are shown in the accompanying drawings wherein:

Fig. 4 is a cross-sectional fragmentary view showing the digger assembly in lowered position with respect to the apron and auger and blower assembly.

Fig. 5 is a cross-sectional view taken on a line 5—5, Fig. 4.

Fig. 8 is a fragmentary perspective view of a slat particularly illustrating the shape and position of the knives thereon.

Figure 1:
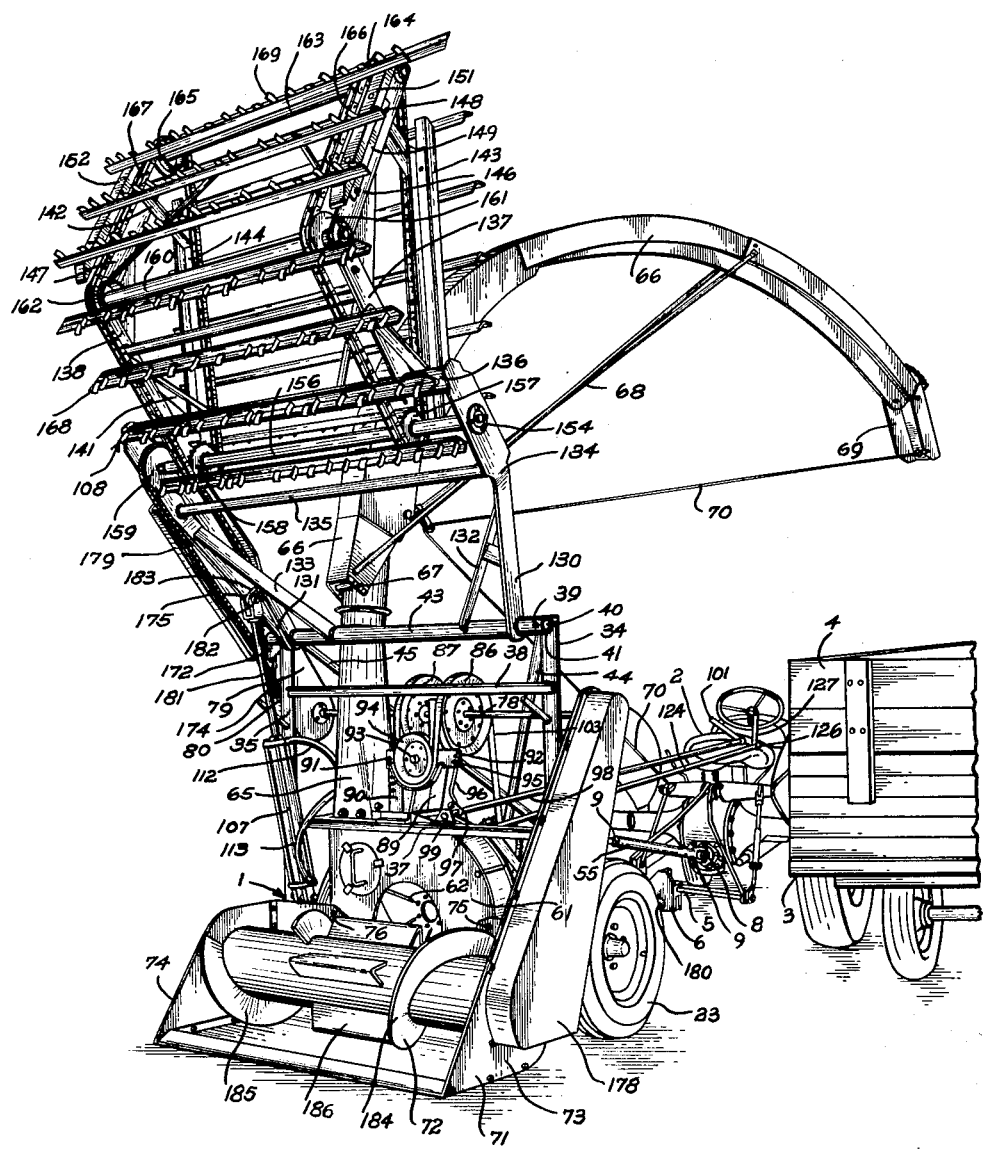
Fig. 1 is a perspective view of my ensilage loader apparatus shown adjacent the truck for transporting the ensilage and with the digger assembly in elevated position.

Referring more in detail to the drawings:

1 designates a loader embodying the improvements of my invention shown attached to a tractor or the like 2 alongside of a truck or wagon 3 having a box 4. The device is attached to the tractor by a hitch 5 to a connection 6 to the frame 7 of the loading device. The loader is operated from the power take-off 8 of the tractor through universal connections 9, as will later be described.

Figure 6:
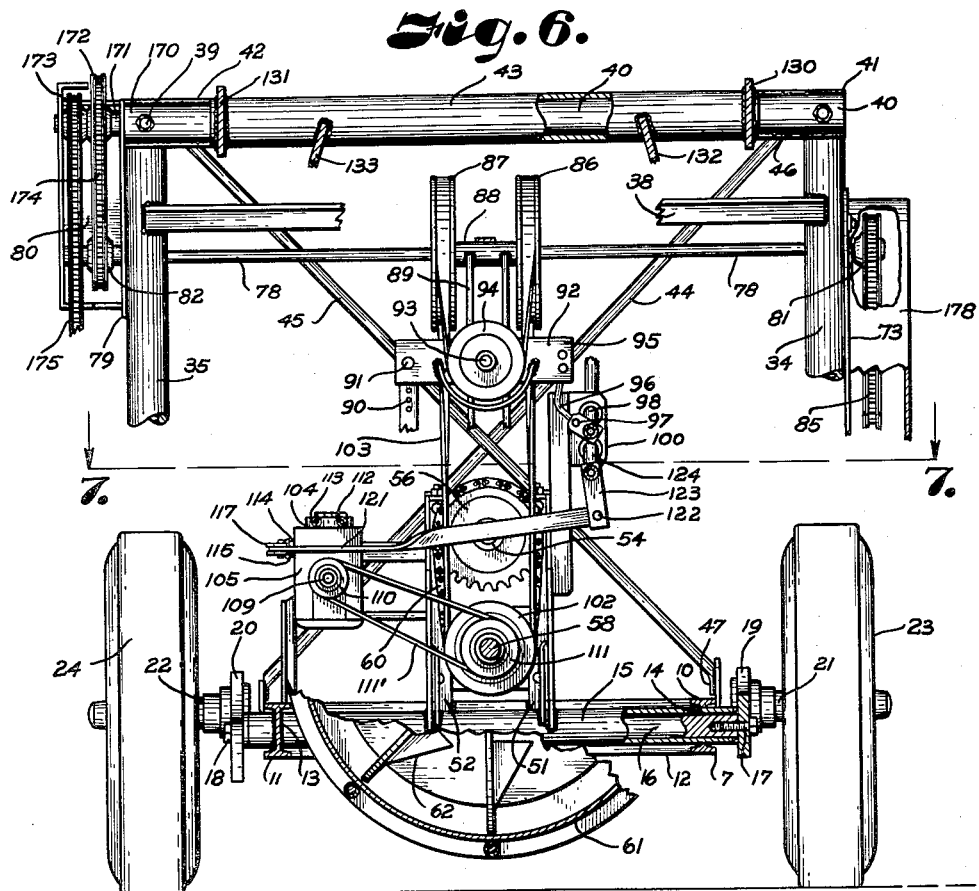
Fig. 6 is a transverse cross-sectional view particularly illustrating the pump and control therefor and fragmentary portion of the clutch control for operating the auger and digger assembly taken on a line 6—6, Fig. 2.
Figure 7:
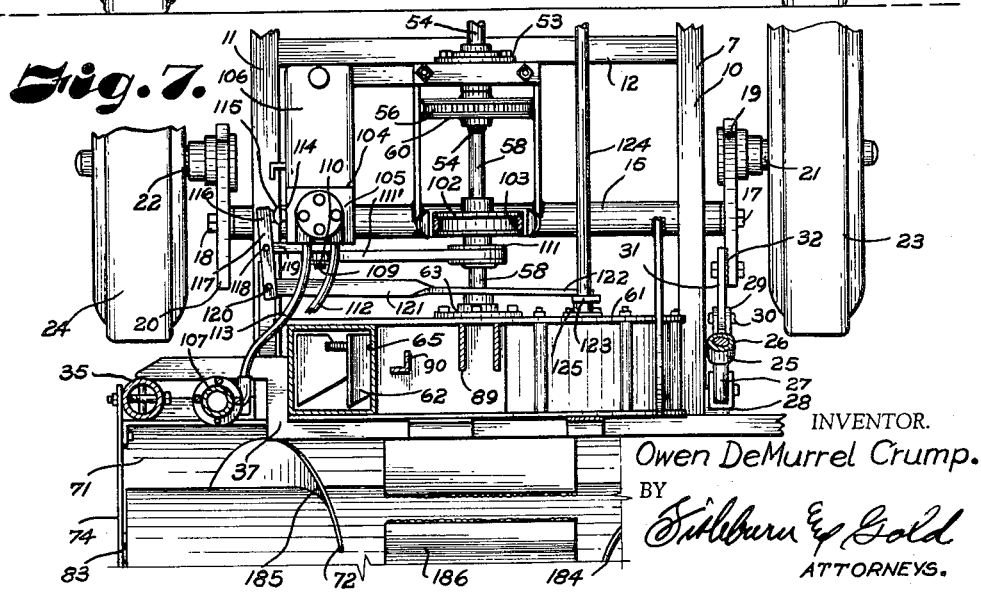
Fig. 7 is a fragmentary cross-sectional view taken on a line 7—7, Fig. 6.

The frame 7 includes side rails 10 and 11 connected by crossbars 12 (Fig. 7). The side members 10 and 11 are of H-beam type, and the webbed portions 13 are provided with aligned openings 14 for receiving a tubular member 15 welded or otherwise suitably secured to the I-beams, as indicated in Fig. 6, and operable in said tubular member is a rod 16 having threaded bores for receiving threaded bolts 17 and 18 for securing thereto arms 19 and 20 on one end of which are mounted short axles 21 and 22 for wheels 23 and 24 for transporting the loader from place to place. A jack 25 is provided for raising and lowering the frame with respect to the ground and consists of a telescoping portion 26 and a rod 27 having one end secured to a bracket 28 on the side member 10 of the frame. The telescoping member 26 has ears 29 to which is pivotally mounted by a pin 30 a bracket arm 31 having its other end rigidly secured as at 32 to the free end of the arm 19 opposite the axle 21 carrying wheel 23. The jack 25 includes a crank arm 33 whereby through operation of the crank the jack will be manipulated to raise and lower the frame with respect to the wheels, the rod 27 being screw threadedly engaged with the telescoping member 26 as is the usual practice.

Figure 2:
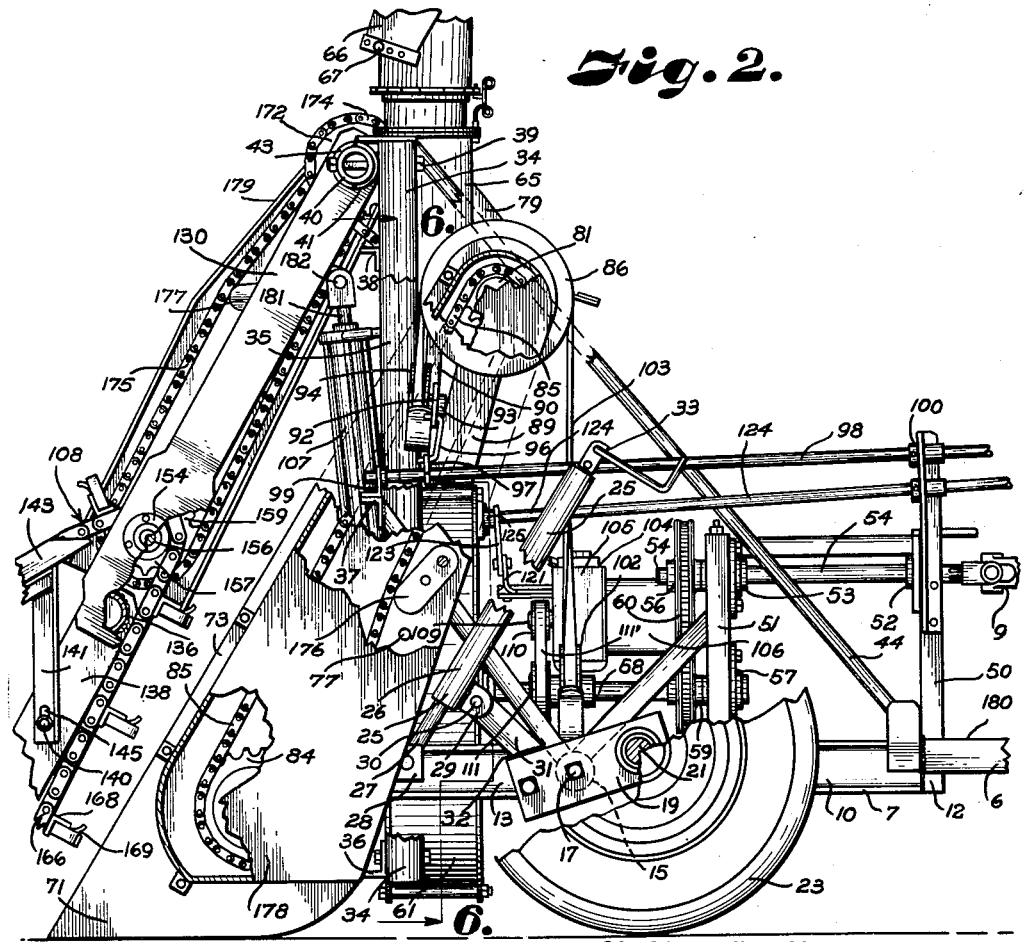
Fig. 2 is a fragmentary side view with parts broken away for better illustration, particularly illustrating the loader in a ground engaging or working position.
Figure 3:
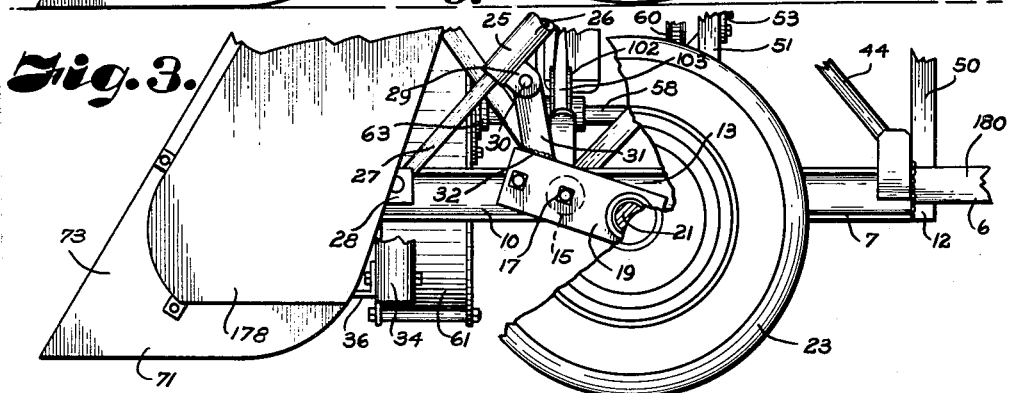
Fig. 3 is a side elevational fragmentary view, particularly illustrating the blower and pan arrangement shown in traveling position.

The frame of the vehicle includes spaced uprights 34 and 35 having their lower ends rigidly secured to the cross member 36 on the side members 10 and 11 substantially slightly forwardly of the wheels 23 and 24, as illustrated in Fig. 2, and mounted between their ends are spaced crossbars 37 and 38 for bracing the uprights. Mounted to the upper ends of the posts 34 and 35 by bolts or the like 39 is a tubular cross member 40 secured in short half-circular sleeves 41 and 42. Sleeved over the tubular member 40 between the half-circular sleeves 41 and 42 is a tubular sleeve 43 and rotatable on the tube 40, as will later be referred to. Cross braces 44 and 45 have their upper ends secured to the half sleeves 41 and 42 and their lower ends secured to the frame as indicated at 46 and 47 to further stabilize the structure.

Mounted on the rear end of the frame 7 are spaced uprights 50 and forwardly thereof are spaced uprights 51 and 52. Mounted on the uprights are bearings 52 and 53 for accommodating a drive shaft 54 connected to the universal shaft 55 leading to the power take-off of the tractor (Fig. 1). The shaft 54 extends forwardly of the upright 51 and has a sprocket 56 mounted thereon. Below the bearing 53 is a bearing 57 for a shaft 58 having a sprocket 59 thereon aligning with the sprocket 56 for accommodating a chain 60.

Mounted on the frame between the uprights 34 and 35 is a blower housing 61 for a fan having the usual blades or the like 62. The shaft 58 extends into the blower housing through a bearing 63 on the fan housing and is connected to the blower fan as indicated at 64 (Fig. 4). Connected to one side at the top of the blower housing is a blower chute 65. Attached to the upper end of the main blower chute 65 is an extension chute 66 which is adjustable thereon by a ratchet bolt or the like 67 to vary the direction of the chute to suit the convenience of the user as to where he desires the ensilage to be placed. The blower chute 66 is here illustrated to be sectional and includes bracing as indicated at 68. It also includes an end member 69 for further directing the ensilage to the desired spot and is controlled from the operator of the tractor by line 70 (Fig. 1).

71 designates a pan or apron for an auger 72 mounted in side plates 73 and 74. The auger pan is bolted to the blower housing by a plurality of bolts as indicated at 75 and 76 and the side plate 73 is elongated and extends upwardly alongside of the upright 34 of the frame and is secured to the frame by bolts or the like, as indicated at 77 (Fig. 2). Mounted in the upper end of the side plate 73 is a transverse jack shaft 78 extending behind the uprights 34 and 35 through a side member 79 of a housing 80 on upright 35. Mounted on each end of jack shaft 78 and adjacent the side members 73 and 79 on the outside thereof are sprockets 81 and 82. The side plates 73 and 74 at the ends of the pan are provided with bearings (not shown) for a shaft 83 for the auger, which also extends outwardly from the side plate 73, and mounted thereon is a lower sprocket 84 aligning with the sprocket 81 for a chain 85 for operating the auger, as will later be described.

Mounted on the jack shaft 78 at substantially the center of the frame are spaced pulleys 86 and 87, and mounted therebetween is a collar or bearing 88 having braces 89 secured thereto and having their other ends connected to the top of the blower housing 61. An upright bracket 90 is suitably secured to the top of the blower housing near the braces 89 and pivotally connected to said bracket as at 91 is one end of an arm 92 carrying a short shaft 93 extending longitudinally of the frame and transversely to the direction of the jack shaft 78. Mounted on the shaft 93 is a pulley 94. The other end 95 of the arm 92 is loosely connected to a rod or link 96 having a loose connection as at 97 with an operating rod 98 with one end thereof rotatably supported in a bracket 99 and an extension of upright 50, as indicated at 100 (Fig. 2), and on to the tractor for operation therefrom, as indicated at 101 (Fig. 1). Mounted on the shaft 58 near the sprocket 59 is a pulley 102 over which is run an endless belt 103 which has its separate lines running over pulleys 86 and 87 and around the clutch pulley 94 whereby the belt may be loosened or tightened by operation of the rod 98 to control rotation of jack shaft 78, as will later be further referred to.

A hydraulic power unit 104 is mounted on the main frame, as illustrated in Fig. 6, and includes a pump 105 and reservoir 106 for hydraulic fluid for operating a cylinder 107 for raising and lowering a digger assembly unit designated generally at 108. The pump includes a shaft 109 having a pulley 110 aligning with a pulley 111 mounted on the shaft 58 of the mechanism having driving connection through a belt 111'. The power unit includes hydraulic fluid lines 112 and 113 leading to the cylinder 107, as illustrated in Fig. 1. The power unit includes a valve 114 having a plunger 115 which engages one end 116 of a lever arm 117. The lever arm is pivotally connected as at 118 at the center thereof to an extension 119 on pump 105. The other end is pivotally attached as at 120 to one end of a link 121 extending transversely across the frame and having its other end 122 loosely connected to an arm 123 rigidly secured to a rod 124. The rod 124 has one end supported in a sleeve 125 on blower housing 61 and extends through the bracket 100 on upright 50 to the tractor for operation therefrom as indicated at 126 through a handle 127 for a purpose later described.

The digger assembly 108 is attached to the tube 43 by a boom arrangement comprising arms 130 and 131 spaced on the boom tube 43 and having braces 132 and 133 secured thereto by welding or the like. The outer or free ends of the arms are turned to a parallel relation as indicated at 134, and a crossbar 135 is rigidly secured between the arms. The outer ends of the arms 130 and 131 are connected by a cross member 136. Spaced inwardly from the ends of the arms 130 and 131 are substantially V-shaped arms 137 and 138, the upper part angling downwardly and the lower part thereof extending horizontally when in a ground engaging position as indicated at 139 (Fig. 4). The arms 130 and 131 and 137 and 138 form a complete boom for the digger assembly.

Secured to the arms 137 and 138 by bolts 140 are uprights 141 and 142 for supporting spaced guides or trackways 143 and 144. The uprights 141 and 142 are provided with slots 145 through which the bolts 140 extend to adjust the trackways 143 and 144 for a purpose later described. Secured to the outside of the arm sections 146 and 147 of arms 137 and 138 by bolts 148 are angle-shaped brackets 149 and 150 for mounting lower trackways or guides 151 and 152. The brackets have slots 153 (Fig. 5) through which the shanks of the bolts 148 extend to adjust the lower trackways for a purpose also later described. Spaced from the ends of the arms 130 and 131 are bearings 154 and 155 for a shaft 156 upon which are mounted spaced sprockets 157 and 158. A larger sprocket 159 is also mounted on shaft 156 between sprocket 158 and arm 131 as shown in Fig. 5. At substantially the joinder between the V-shaped arms 137 and 138 in the portions 146 and 147 is a shaft 160 having pulleys 161 and 162. In alignment with the sprockets 157 and 158, and pulleys 161 and 162, and mounted in the outer ends of the arm portions 146 and 147 is a shaft 163 upon which are mounted pulleys 164 and 165. It will be obvious that the arms 137 and 138 and the trackways 143, 144, 151 and 152 form a substantially triangular arrangement provided by the sprockets and pulleys just above referred to and adapted to run over the sprockets are endless chains 166 and 167 having a plurality of slats 168 extending therebetween with their ends extending beyond the chains and riding on the trackways 143, 144, 151 and 152. The slats or crossbars 168 are angle shaped and include downwardly and sidewardly extending spaced knives 169 and 169' for digging into the ensilage. The knives are secured as by welding or the like 168' to an angle portion of the slats 168 (Fig. 8). The knives 169 are curved toward the auger 72 on all the slats and the knives 169' on one slat are curved laterally in one direction with respect to the knives 169 and on the next adjacent slat the knives 169' are curved in the opposite direction (Fig. 1) to insure digging and cutting and movement of the ensilage to the auger.

Mounted in the end 170 of the tube 40 and extending outwardly from the upright 35 is a short shaft 171 upon which are mounted spaced sprockets 172 and 173. The sprocket 172 aligns with the sprocket 82 on the shaft 78 so that when the shaft 78 is rotated through the main drive shaft 58 and belt connection over pulleys 102, 86, 87 and 94 the short shaft 171 will also rotate through a chain 174 running over said sprockets 82 and 172 and thus rotate sprocket 173.

The sprocket 173 has a chain 175 running thereover and engages sprocket 159 mounted on the shaft 156 inside of the arm 131, as illustrated in Figs. 1 and 5, so that when the shaft 78 and short shaft 171 are operated the chain 175 will drive the shaft 156 to drive the endless chains 166 and 167 to operate the digger assembly for moving the ensilage into the pan 71.

To regulate the tension of the chains 166 and 167 the bolts 140 and 148 are loosened and the trackways, engaged by the slats 168 on said chains, adjusted accordingly. The tightening of the chains 85 and 175 may be accomplished by arms 176 and 177, as shown in Figs. 2 and 4 as is the usual practice. A housing 178 is secured to the side plate 73 for the apron of the auger housing to cover the sprockets 81 and 84 and chain 85 which drives the auger 72. A housing 179 is also provided for the chain 175.

In operation of a device assembled and constructed as described the loader is hooked up to the tractor through the hitch 5 and the universal power shaft 55 connected to the power take-off 8 of the tractor. Use of the adjusting jack 25 is utilized for adjustment of the height of the vehicle to bring the hitch to desired height for attaching to the tractor draw bar 180. The loader is then backed into the ensilage pit (not shown) and the frame lowered by the jack 25 so that the apron 71 will rest on the ground and take some of the weight off of the wheels. The apron is backed into the ensilage in the pit and the device is ready for use.

By operation of the shaft 54 through the universal shaft 55 from the power take-off of the tractor and chain connection 60 over the sprockets 56 and 59 the main shaft 58 is rotated for operation of the blower. The shaft 58 also operates the pulley 102 thereon having belt connection with pulleys 86 and 87 and clutch pulley 94 for rotation of the jack shaft 78 for rotation of the sprockets 81 and 84 through chain 85 for rotation of the auger 72 in the apron 71.

The digger assembly 108 being attached to the tubular member 43 and rotatable in a swinging vertical movement is operable through the hydraulic cylinder 107 having a piston rod 181 with its free end pivotally attached, as indicated at 182, to an arm 183 rigidly secured to the inside of the arm 131. Rotation of the rod 124 will operate the valve 114 for controlling fluid from the power unit through lines 112 and 113 to the cylinder 107. The lower end of the cylinder is pivotally attached to the frame of the vehicle and the digging element may be swung to lowered working position as shown in Fig. 4, and the digging element controlled by use of the control handle 127 for tightening of belt 103 through pulley 94, as previously referred to. When the digging element is in lowered position the chain 175 will rotate the shaft 156 through the sprocket connection therewith and rotate the endless chains and slat members 168 to rotate the same in an anti-clockwise direction to cause the digging elements 169 to move the ensilage into the apron pan 71 where the auger blades 184 and 185 move the ensilage to the center thereof, and the blades 186 pick the ensilage up and move it in a clockwise direction so that it will move upwardly to the opening 187 in the forward face of the blower housing 61 where the suction of the blower will pull it into the blower and then push it through the blower and then push it through the blower tube 65 to the spout extension 66 and to the box of the vehicle for transporting the ensilage to the place of use.

It will be obvious, of course, that as the digging element moves the ensilage into the apron the device may be moved toward the ensilage by the tractor to keep the digging element working in the ensilage when it has reached the bottom thereof in one position.

It will further be obvious that I have provided an improved loader for ensilage whereby the structure is exceedingly mobile and may be used in open trench or other places where material such as ensilage is deposited.

What I claim and desire to secure by Letters Patent is:

1. Apparatus for picking up ensilage from an open trench or the like operable from the power take-off of a tractor comprising, a mobile frame having spaced standards thereon, a blower housing having an opening in the front side carried by the frame, a spout connected to said blower housing, a pan having a bottom and an open front, a shaft in said pan, an auger mounted on said shaft, said auger having longitudinal fins passing closely to said opening in the blower housing when the auger is rotated and having oppositely facing spiral blades thereon to direct the ensilage to said fins, said auger pan having side plates, one of said plates extending upwardly alongside one of said uprights, a bracket carried by the frame opposite said plate, a jack shaft carried by the upper end of said plate and said bracket, one end thereof extending outwardly from one side of said plate, a sprocket on said end of said shaft, a sprocket on the auger shaft aligning with said first-named sprocket, a chain running over said sprockets, a short shaft on said bracket, a sprocket on said short shaft, a tubular member rotatably mounted on the upper ends of said uprights, a boom frame having side arms attached to said tubular member, a digger element rigidly attached to said arms, a rotatable shaft carried by said arms near the outer ends thereof, a sprocket on one end of said shaft, said digger element including chains and slats secured thereto having spaced teeth, a main drive shaft carried by the frame extending into said blower housing, a fan on said end of said shaft, a shaft on said frame having driving connection with the tractor, means on said jack shaft having connection with the last-named shaft for rotating said jack shaft for rotating said auger, a shaft on one outer end of the tubular member, spaced sprockets on said last-named shaft, a chain operable over one of said last-named sprockets and the sprocket on the shaft on the outer ends of the boom arms cooperating with means on said jack shaft for rotating said chain on the digger element, hydraulic means carried by the frame operable from said tractor and having connection with one of the boom arms for lowering said digger element to the ensilage for moving the same to said pan where the auger moves it to said opening in said blower housing.

2. Apparatus for picking up ensilage from an open trench or the like operable from the power take-off of a tractor comprising, a mobile frame having spaced standards thereon, a blower housing having an opening in the front side carried by the frame, a spout connected to said blower housing, a pan having a bottom and an open front, a shaft in said pan, an auger mounted on said shaft, said auger having longitudinal fins passing closely to said opening in the blower housing when the auger is rotated and having oppositely facing spiral blades thereon to direct the ensilage to said fins, a jack shaft carried by the upper end of said plate and said bracket, chain and sprocket means connected to the jack shaft and to said auger shaft for rotating said auger, a tubular member rotatably mounted on the upper ends of said uprights, a boom frame having side arms attached to said tubular member, a digger element rigidly attached to said arms, said boom including substantially V-shaped spaced arms on its outer end, said digger element including sprocket and chains and having slats secured thereto having spaced knives, said chains and slats being rotatable around said V-shaped arms, a main drive shaft carried by the frame extending into said blower housing, a fan on said end of said shaft, a shaft on said frame having driving connection with the tractor, means on said jack shaft having connection with the last-named shaft for rotating said jack shaft, means on said tubular member having connection with means on the jack shaft for rotating said chain on the digger element, hydraulic means carried by the frame having connection with one of the boom arms for lowering said digger element to the ensilage for moving the same to said pan where the auger moves it to said blower.

3. Apparatus for picking up ensilage from an open trench or the like operable from the power take-off of a tractor comprising, a mobile frame having spaced standards thereon, a blower housing having an opening in the front side carried by the frame, a spout connected to said blower housing, a pan having a bottom and an open front, a shaft in said pan, an auger mounted on said shaft, said auger having longitudinal fins passing closely to said opening in the blower housing when the auger is rotated and having oppositely facing spiral blades thereon to direct the ensilage to said fins, a jack shaft carried by the upper end of said plate and said bracket, chain and sprocket means connected to the jack shaft and to said auger shaft for rotating said auger, a tubular member rotatably mounted on the upper ends of said uprights, a boom frame having side arms attached to said tubular member, a digger element rigidly attached to said arms, said boom including substantially V-shaped spaced arms on its outer end, said digger element including sprockets and chains and having slats secured thereto having spaced knives, said chains and slats being rotatable around said V-shaped arms, certain of said knives on the slats being curved in a direction of travel toward said auger and certain of the knives on the slats being curved laterally to said other knives, the laterally curved knives on one slat being turned in the opposite direction to the laterally curved knives on the next adjacent slat, a main drive shaft carried by the frame extending into said blower housing, a fan on said end of said shaft, a shaft on said frame having driving connection with the tractor, means on said jack shaft having connection with the last-named shaft for rotating said jack shaft, means on said tubular member having connection with means on the jack shaft for rotating said chain on the digger element, hydraulic means carried by the frame having connection with one of the boom arms for lowering said digger element to the ensilage for moving the same to said pan where the auger moves it to said blower.

4. In apparatus for picking up ensilage from a pile and depositing the same in a truck operable from the power take-off of a tractor or the like, said apparatus having a mobile frame with spaced standards and a pan having a center delivery auger therein and a blower in ensilage receiving position relative to the auger and having a delivery chute, a digger element including a boom rotatably mounted on said standards, said boom including spaced arms, a cross bar rigidly mounted on the outer end of the arms, substantially V-shaped arms rigidly mounted on said cross bar, a shaft carried by the spaced arms on said boom, a shaft on the outer ends of said V-shaped arms, spaced sprockets and chains carried by said shafts, spaced slats on said chains having knives thereon, means for raising and lowering said boom, and drive means carried by said frame and cooperating with the shaft on the spaced arms of said boom and operable from the tractor for rotating the last-named shaft to cause the chains to rotate around said V-shaped arms so that the knives will engage and loosen said ensilage and move it to said pan.

5. In apparatus for picking up ensilage from a trench and depositing the same in a truck or the like operable from the power take-off of a tractor, said apparatus having a mobile frame with spaced standards and a pan having a center delivery auger therein and a blower in ensilage receiving position relative to the auger and having a delivery chute, a digger element including a boom rotatably mounted on said standards, said boom including spaced arms, a cross bar rigidly mounted on the outer end of the arms, substantially V-shaped arms rigidly mounted on said cross bar, adjustable spaced guides carried by the V-shaped arms, a shaft carried by the spaced arms on said boom, a shaft on the outer ends of said V-shaped arms, sprockets and chains carried by said shafts, spaced slats on said chains having knives thereon, said chains and slats being operable over said guides and around the V-shaped arms, means for raising and lowering said boom, and drive means carried by said frame and cooperating with the shaft on the spaced arms of said boom and operable from the tractor for rotating the last-named shaft to cause the chains to rotate around the V-shaped arms so that the knives will engage and loosen said ensilage and move it to said pan.

6. In apparatus for picking up ensilage from a pile and depositing the same in a truck or the like operable from the power take-off of a tractor, said apparatus having a mobile frame with spaced standards and a pan having an auger therein and a blower in ensilage receiving position relative to the auger and having a delivery chute, a digger element including a boom rotatably mounted on said standards, said boom including spaced arms, a cross bar rigidly mounted on the outer end of the arms, substantially V-shaped arms rigidly mounted on said cross bar, spaced guides carried by the V-shaped arms, a shaft carried by the spaced arms on said boom and having an end extending outside one of said arms on the boom, a shaft on the outer ends of said V-shaped arms, spaced sprockets and chains carried by said shafts, spaced slats on said chains having knives thereon, means for raising and lowering said boom, and drive means carried by said frame and cooperating with means on said end of the shaft on the spaced arms of said boom and operable from the tractor for rotating the last-named shaft to cause the chains to rotate around the V-shaped arms so that the knives will engage and loosen said ensilage and move it to said pan when the boom is lowered into the ensilage.

References Cited in the file of this patent

UNITED STATES PATENTS 2,877,057    Buman _____ Mar. 10, 1959